United States Patent [19]

Bettcher

[11] 4,198,750

[45] Apr. 22, 1980

[54] RING BLADE KNIFE HAVING WEAR PLATE

[75] Inventor: Louis A. Bettcher, Amherst, Ohio

[73] Assignee: Bettcher Industries, Inc., Birmingham, Ohio

[21] Appl. No.: 951,594

[22] Filed: Oct. 16, 1978

[51] Int. Cl.[2] ..... A22C 17/04

[52] U.S. Cl. ..... 30/276

[58] Field of Search ..... 30/276, 347; 17/1 G

[56] References Cited

U.S. PATENT DOCUMENTS

| | | | |
|---|---|---|---|
| 1,239,489 | 9/1917 | Jackson | 30/276 |
| 1,648,931 | 11/1927 | Barry | 30/276 |
| 3,461,557 | 8/1969 | Behring | 30/276 |

FOREIGN PATENT DOCUMENTS

| | | | |
|---|---|---|---|
| 26408 | 7/1923 | France | 30/276 |

*Primary Examiner*—Jimmy C. Peters

*Attorney, Agent, or Firm*—Watts, Hoffmann, Fisher & Heinke Co.

[57] ABSTRACT

A hand knife for use in processing meat. The knife has a handle, a circular housing secured to one end of the handle, and a rotatably power driven ring-like blade in part circumferentially contained by the housing. An arcuate wear pad or plate overlies a portion of the inside surface of the blade adjacent the handle limiting movement of the blade away from the blade housing near the handle and against the surrounding housing opposite the handle during use, distributing wear that otherwise occurs between the interior of the surrounding housing and the outside of the blade, and transferring some of the wear to the exterior of the wear plate and the inside of the blade. The ends of the wear plate are tapered outwardly and toward the blade and each has a surface transverse to and overlying the inside surface of the blade. The transverse surfaces form knife edges at the inside surface of the blade and deflects outwardly cut portions of product being processed as they move through the blade and housing and limit their movement circumferentially with the blade.

5 Claims, 5 Drawing Figures

RING BLADE KNIFE HAVING WEAR PLATE

BACKGROUND OF THE INVENTION

1. Field of the Invention

This invention relates to hand knives having ring-like rotary cutting blades used primarily in the packing house and meat distribution industries.

2. Prior Art

Hand knives having power-driven, ring-like rotary blades have been used for some time in packing houses, meat distribution or wholesale houses and the like, for trimming and/or slicing meat and removing meat particles from bone. Such knives are commonly referred to as trimming and slicing knives and boning knives. Examples of such knives are shown in U.S. Pat. No. 3,852,882. The ring-like blades are typically supported in the blade housing by an external flange on the blade engaging in an interior groove-like aperture in the blade housing. The ring-like blades rotate in a sliding relationship within a ring-like housing. During use of the knife a portion of the blade opposite the handle is pressed against the product being processed and normally drawn in the direction of the operator causing portions of the blade remote from the handle to be drawn against the housing and in some instances the blade is distorted because of its relative thinness. The rubbing of the blade against the blade housing results in wear of the housing which is typically made of softer material than the blade with the result that the blade becomes unduly loose in the blade housing reducing the efficiency of the knife and ultimately loss of drive. Pressing the blade against the product being processed also tilts the blade in the blade housing which results in further wear between the blade and housing.

The concentration of wear between the blade and housing at specific locations around the housing as mentioned above results in premature weakening of the housing and creates excess clearance between the blade and housing, with an accompanying failure of the housing to maintain the blade in a position necessary for smooth running of the blade and proper engagement of the drive mechanism with the blade. Excess clearance between the blade and housing also makes it difficult to effectively hone or sharpen the blade without removing it from the housing. Replacement of the housing and blades necessitated by such excess wear can result in a substantial increase in the cost of using the knives, especially where large numbers of knives are used.

SUMMARY OF THE INVENTION

This invention provides a novel and improved hand knife having a power-driven ring-like rotatable blade in a ring-like housing which knife is particularly suitable for use in packing houses and the like and is constructed to substantially reduce the wear between the blade and the blade housing encountered in similar prior art knives.

The invention also provides a knife of the character referred to which deflects portions of a product cut therefrom by the knife away from the product and limits their moving in an arcuate path with the blade.

The features and objects of this invention are accomplished with a novel wear plate or pad of arcuate configuration within the blade and blade housing adjacent to the handle which plate during use of the knife engages an inside surface of the ring-like blade adjacent the connection of the blade housing to the handle. The arcuate wear plate holds the blade circular and concentric and firmly in the blade housing and prevents tilting of the blade in the housing and transfers much if not all of the wear that normally occurs between the outside of the blade and the blade surrounding housing to the inside of the blade and wear plate. While the hardness of the housing is limited by the fact that it must have spring-like qualities, the hardness of the wear plate is not so limited and it resists wear to a substantially greater extent.

An end surface of the wear plate may if so desired be constructed and located so as to deflect cut portions of product being processed in an outwardly direction and away from the blade as they pass through the central opening of the blade and housing and limiting their movement in a circular path with the blade.

The above and other objects, features and advantages of the invention will become better understood and more apparent from the following description of the preferred embodiment of the invention, when considered with the accompanying drawings.

DESCRIPTION OF THE PREFERRED EMBODIMENTS

Figure 1:
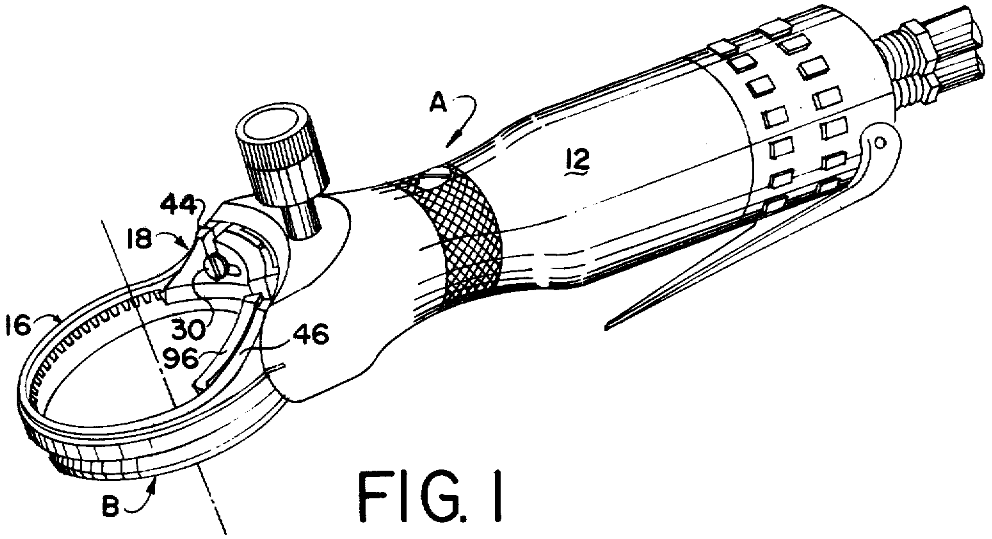
FIG. 1 is a perspective view of a knife embodying the invention.
Figure 2:
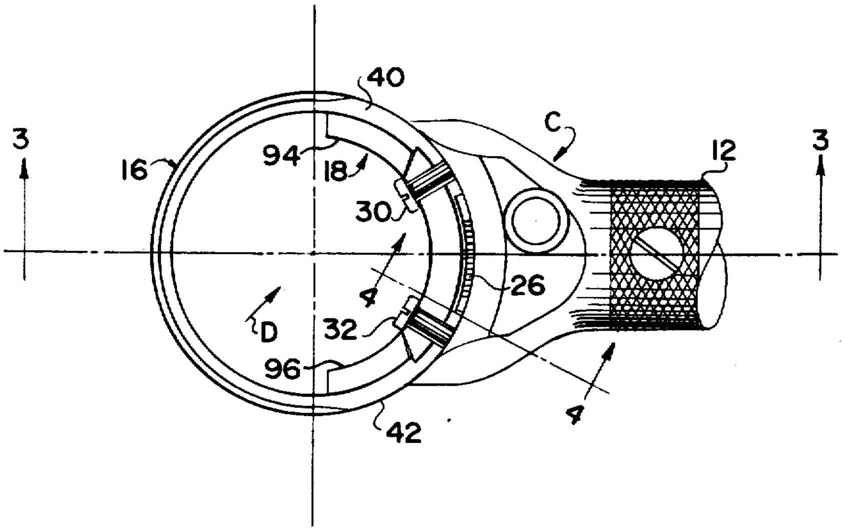
FIG. 2 is a top plan view of a portion of the knife shown in FIG. 1.
Figure 3:
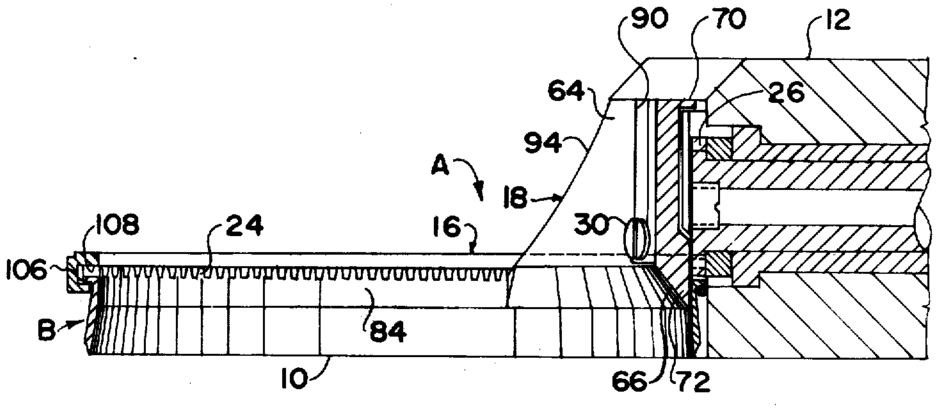
FIG. 3 is an enlarged sectional view approximately on the line 3—3 of FIG. 2.
Figure 5:
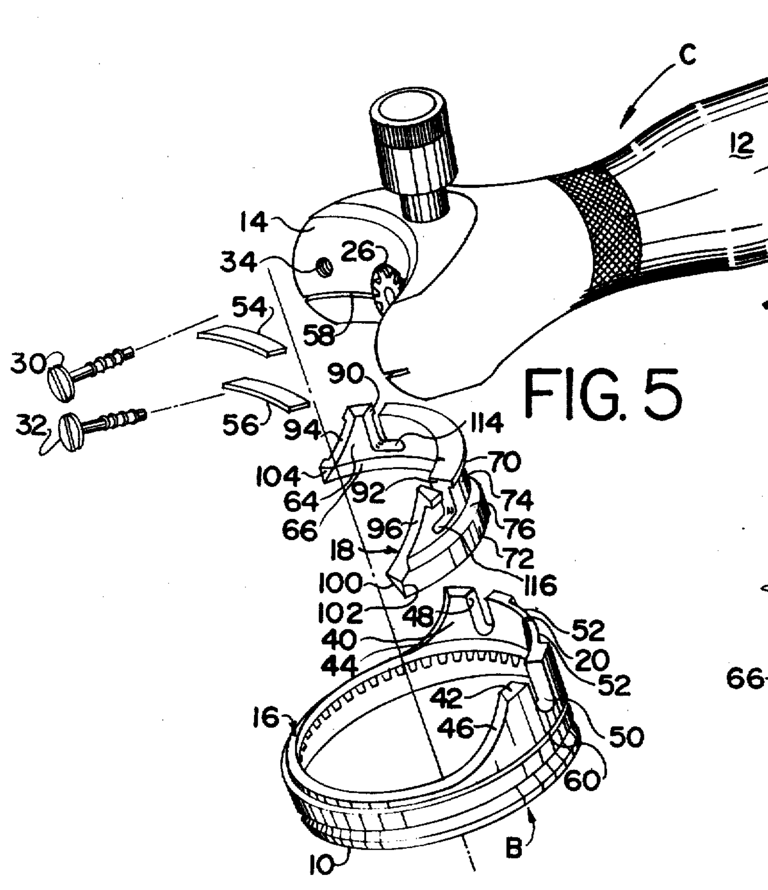
FIG. 5 is a perspective exploded view of the knife shown in FIG. 1.
Figure 4:
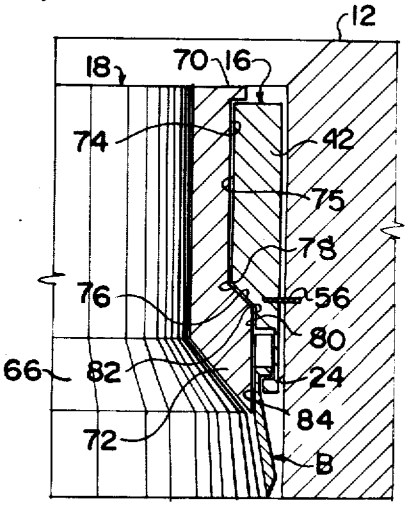
FIG. 4 is an enlarged sectional view approximately on the line 4—4 of FIG. 2.

A knife embodying the present invention is shown in the drawings and designated generally by the reference character A. The knife comprises a relatively thin annular, solid ring-like blade B of relatively short axial length having a peripheral cutting edge 10 at one end and supported for rotation in a frame assembly C. The knife A is generally similar to that shown in FIGS. 1 to 3 of the aforementioned U.S. Pat. No. 3,852,882 and is typically referred to as a boning knife. It is to be understood, however, that the invention is applicable to the other rotary bladed knives including the knife shown in FIGS. 4 and 5 of U.S. Pat. No. 3,852,882, th disclosure of which patent is incorporated herein by reference. The frame assembly C comprises a tubular handle member 12 having a concave arcuate surface 14 at one end, a split ring-shaped blade supporting member or housing 16 and an arcuate wear plate or pad 18. The wear plate 18 is positioned adjacent the handle members 12 and the split 20 of the housing 12 is centered on the arcuate surface 14 of the handle member 12.

The ring-shaped blade B is of short axial length, is rotatably supported in the housing 16, with the cutting edge 10 at one end projecting from one end of the housing 16. Gear teeth 24 on the other end of the blade B are within the blade housing. The blade B is rotated by a gear 26 located at the arcuate surface 14 of the handle member 12 and in mesh with the gear teeth 24 on the blade B. The gear 26 is rotatably supported in the handle member 12 and driven in any suitable manner, such as, in the same manner as the corresponding gears of the knives shown in U.S. Pat. No. 3,852,882.

The blade supporting housing 16 and the plate 18 are detachably connected to the handle member 12 by two headed and threaded fasteners 30, 32 at opposite sides of the split 20 in the member 16, which fasteners are threaded into suitably tapped apertures 34 opening into the arcuate surface 14 of the handle member.

The major part of the housing 16 is of short axial length, being less than half that of the blade B, and has portions or parts 40, 42 at opposite sides of the split 20 of substantially greater axial length than that of the remainder of the member 16. The parts 40, 42 of the blade housing, in the depicted embodiment, terminate in surfaces 44, 46 inclined outwardly and in the direction of the cutting edge of the blade B. The parts 40, 42 have axial slots 48, 50 opening into the ends thereof opposite to the end of the housing 16 from which the cutting edge 10 of the blade B projects. The parts of the shanks of the fasteners 30, 32 adjacent the heads thereof, preferably, are reduced in diameter to the root diameter of the threads of the fasteners. The portions of the shank of the fasteners of reduced diameter adjacent to their heads extend through the slots 48, 50 in the housing 16 at opposite sides of the split 20. The widths of the slots 48, 50 are preferably only slightly larger than shank parts of the fasteners that pass therethrough. The exterior of the blade housing 16 at the parts 40, 42 abuts the arcuate surfaces 14 of the handle member 12 and an axial aperture 52 in each end of the housing 16 at the split 20 provides clearance for the gear 26. In the knife shown the apertures 52 open into the upper end of the housing 16 as viewed in the drawings.

In the knife shown the blade housing 16 is located axially on the concave surface 14 of the handle member 12 by two relatively thin flat arcuate keys 54, 56 located at opposite sides of the gear 26 and inserted half and half in narrow slots 58, 60 in the arcuate surface 14 of the handle member and the exterior of the blade housing 16 at the locations of the parts 40, 42 of the blade housing of increased axial length.

The construction of the member 16 and the manner of its connection to the handle member 12 permits the blade housing 16 and the blade B carried thereby to be removed from the handle 12 assembly by merely loosening the fasteners 30, 32 sufficient to allow the blade housing 16 to clear the keys 54, 56. Thereafter the blade housing 16 and blade B can be readily dropped from the handle member 12 as the knife is viewed in the drawings. Once the assembled parts 16, B are removed from the other parts of the knife the blade B can be easily removed from the member 16 by expanding the member. The blade can then be conveniently sharpened and replaced or replaced by a different sharp blade.

The wear plate 18 is arcuate in shape, has, in the embodiment shown, an axial length about the same as that of the portions 40, 42 of the housing 16, a circumferential length about equal to that of the same portions 40, 42 and is secured against the portions 40, 42 of the housing by the fasteners 30, 32. The circumferential length of the member 18 may be different than that shown and may, if desired, extend entirely around the interior of the member 16. The plate 18 has a cylindrical concave surface 64 facing toward the center of the ring-like housing 16 and the end thereof facing in a direction toward the cutting edge 10 of the blade B terminates in a receding frusto-conical arcuate surface 66. The axial upper and lower ends of the wear plate 18 have flange portions 70, 72 on the convex side of the plate which flanges in the knife shown are of equal outside diameter. The flanges 70, 72 are spaced by a cylindrical convex surface 74 of smaller outside diameter. The arcuate convex surface 74 on the member 18 engages an arcuate concave surface 75 on the member 16. The flange portion 70 engages an upper edge of the housing 16.

The upper end of the flange portion 72 of the plate 18 terminates in a beveled or frusto-conical surface 76 which engages a complimentary beveled or frusto-conical surface 78 at the lower ends of each of the portions 40, 42 which portions 40, 42 are thicker than the remainder of the housing 16. The added thickness is on the interior or concave side of the housing member and provides an arcuate cylindrical surface 80 at the lower ends thereof which is abutted by the upper part of a cylindrical arcuate surface 82 on the outer or exterior side of the flange 72. The flanges 70, 72 and the surfaces 76, 82 on the flange 72 of the member 18 and the surfaces 78, 80 on the housing member 16 locate the member 18 on the housing member in the axial direction. The engagement between the cylindrical arcuate surface 82 on the outer or exterior side of the flange 72 and the complimentary surface 80 on the housing 16 spaces the surface 82 on the member 18 in the required close proximity to a interior cylindrical surface 84 on the upper part of the blade B. The outside diameter of the surface 74 of the plate 18 is comparable to the inside diameter of the housing portions 40, 42 and fits closely thereagainst, while the inside diameter of the surface 80 is just slightly smaller than the inside diameter of the blade B by enough to provide a running clearance when the blade is concentric with the blade housing and with the center of curvature of the wear plate.

In the drawings the lower surface of the flange 70 on the member 18 and the upper end of the member 16; the surfaces 74 on the means 18 and the internal surface on the member 16; and the beveled surfaces 76 on the member 118 and 78 on the member 16 which engage one another are shown spaced for the purpose of facilitating their identification.

Axially extending slots 90, 92 in the wear plate 18 open through the upper or top end thereof to accommodate removal of the plate from the handle 12 similarly to the removal of the assembled blade B and blade housing 16. Opposite ends 94, 96 of the wear plate 18 are inclined, in a manner which may be similar to the opposite ends of the parts 40, 42 of the blade housing 16.

A flat portion 100 on the end 96 of the plate 18 and extending the height of the beveled portion 66 on the plate, is oriented transversely to the inside cylindrical surface 84 of the blade B and faces toward the direction from which the blade approaches the surface during rotation in the counterclockwise direction as viewed in the drawings. In the preferred embodiment the flat portion 100 extends at an angle of about 10° to 20° from a plane perpendicular to the surface 84 of the blade B, forming an acute included angle, preferably of 70° to 80°, with the surface 82. In the preferred embodiment shown, the plate 18 extends through about 180° and the flat portion 100 is located near the midpoint of the ring-like housing 16, about halfway around the housing from the central axis of the handle 12. As a slice is being cut from a product being operated upon it tends to travel circumferentially with the blade and will be obstructed and deflected upwardly and prevented from continued circumferential travel with the blade B by the surface 100 on the plate 18, which materially aids the operator in the cutting operation. To assure effective deflection of the product, the surface 100 joins the surface 82 at a straight knife-like sharp edge 102 that for practical purposes rides against and scrapes the inside surface portion 84 of the blade B although normally there is a slight clearance between the parts. A flat portion 104 at the opposite end 94 of the wear plate 18 is a mirror image of the portion 100. Only one surface functions, depending upon the direction of rotation of the blade B, which is opposite for right- and left-handed use.

The upper circumferential flange 106 of the blade B extends into the interior circular channel 108 of the housing 16 with a small clearance between an outer peripheral surface of the flange and the opposed surface of the channel. When force is exerted against one portion of the blade, such as at the left side of FIG. 3 in a direction away from the handle 12, as when the knife is drawn toward the operator, the blade B has a tendency to both distort due to its thinness and move toward the left. This eliminates any clearance over a limited arc between parts of the opposing surfaces of the blade and the surrounding housing, such as the periphery of the flange 106 and the bottom surface of the channel 108 causing the surfaces to contact along peripherally short portions, resulting in high pressure over a limited area with substantial frictional force and accompanying wear particularly of the less hard housing. The housing 16 of the depicted knife is particularly susceptible to wear because it is necessarily made of a metal, such as a steel alloy, soft enough to have spring characteristics that accommodate insertion and removal of the blade. The blade distortion and movement mentioned above is reduced or eliminated by the wear plate 18 which tends to or maintains the blade circular and concentric with the housing 16.

The extensive arcuate length of the plate 18, about 180° in the depicted knives, inhibits distortion of the blade, maintains the blade concentric with the blade housing and prevents tilting of the blade in the housing. With the present knife wear is occasioned primarily between the inside surface of the relatively hard blade B and the opposed relatively hard metal wear plate 18. Since these surfaces are hard and large, wear on the housing 16 is greatly diminished. The effect of the wear plate 18 is to transfer the wear from the exterior of the knife B and the interior of the blade housing 16 to the interior of the knife B and the exterior of the wear plate 18.

In some operations the knife is moved toward and simultaneously away from the operator. In the case of a right-hand operator more or less in the direction indicated by the arrow D in FIG. 2, the pressure of the product against the blade is in the opposite direction. From the previous discussion it will be apparent that the optimum location of an arcuate wear plate 18 about the control opening through the blade B and blade housing 16 is to have it centered with respect to the pressure on the blade. In the depicted knife provision is made for axially adjusting the plate 18 relative to the blade holder in the form of circumferential slots 114, 116 connecting with the bottom ends of the axial slots 90, 92 in the plate 18, respectively, and extending therefrom in a clockwise direction as the knife is viewed in the drawings. Similar circumferential slots may be provided at the opposite sides of the slots 90, 92 either alone or in combination with the slots 114, 116. The adjustment of the plate 18 is accomplished by loosening the fasteners 30, 32, moving the plates to the desired angular position and retightening the fasteners. In place of the slot construction described the axial portions 90, 92 of the slots shown could be omitted and the circumferential extending slots 114, 116 combined into a single circumferential slot opening into one or the other circumferential end of the member 18.

In the depicted knife the flanges 70, 72 of the wear plate 18 and the surfaces on the blade housing against which they engage locate the wear plate relative to the blade and blade housing to provide the desired clearance between the blade and wear plate to produce the optimum performance. It will be understood, however, that other constructions may be employed to obtain the same results. For example, the adjoining surfaces of the blade housing and wear plate may be plain or smooth cylindrical surfaces and the wear plate located axially of the knife housing by employing countersunk headed fasteners to secure the wear plate to the handle assembly or to the blade housing if the blade housing is independently connected to the handle member.

From the foregoing description of the preferred embodiment of the invention and suggested alternative constructions it will be apparent that the objects heretofore mentioned and others have been accomplished and that there has been provided a novel and improved knife especially designed for slicing and/or trimming meat and removing meat from bones which has a power driven, rotatable blade of short axial length supported in a ring-like housing connected to a handle assembly, and which includes a wear plate that materially reduces wear of the blade housing and incidentally deflects cut portions or a product being processed from the blade and prevents them from following the rotation of the blade.

While a preferred embodiment of the invention has been described in detail, it will be apparent that various modifications and alterations other than those suggested may be made therein without departing from the spirit and scope of the invention set forth in the appended claims.

I claim:

1. A hand knife for cutting meat and the like comprising a handle, a ring-like blade housing secured at one portion to and extending from the handle, a ring-like solid blade carried by the housing for rotary movement relative to the housing, said housing circumferentially encircling a portion of the outside periphery of the blade, an arcuate member secured against said housing adjacent the handle of said knife, said arcuate member having an arcuate surface facing an inside circular surface of said blade and located relative to said housing to contact an inside circular surface of said blade when a force is applied to said blade in a direction having a component away from said handle.

2. A hand knife for cutting meat and the like comprising a handle, a ring-like blade housing secured to and extending from the handle, a ring-like blade carried by the housing for rotary movement relative to the housing, said housing circumferentially encircling a portion of the outside periphery of the blade, the housing having a circular portion with an inside diameter substantially equal to the outside diameter of the blade and an arcuate portion where the housing is secured to the handle with an inside diameter smaller than that of said circular portion and axially displaced from the plane of said circular portion, a wear plate secured against said housing adjacent said arcuate portion thereof, said wear plate having a first and second arcuate surface portions facing in the direction of the inside circular surface of the blade, said first arcuate surface portion having an outside diameter substantially equal to the inside diameter of said arcuate portion of the housing and said second arcuate surface portion of the wear plate having an outside diameter substantially equal to the inside diameter of said blade and located relative to the housing to contact the inside circular surface of the blade during cutting when a force is applied to the blade in a direction having a component away from the handle.

3. A hand knife for cutting meat and the like comprising a handle, a ring-like blade housing secured at one portion to and extending from the handle, a ring-like blade carried by the housing for rotary movement relative to the housing, said housing circumferentially encircling a portion of the outside periphery of the blade, a wear plate secured against said housing adjacent the handle of said knife, said plate having an arcuate wear surface facing the inside circular surface of the blade and located relative to the housing to contact the inside circular surface of the blade during cutting when a force is applied to the blade in a direction having a component away from the handle, and having an end surface transverse to and directly adjacent the inside circular surface of the blade, facing toward the direction of blade rotation to deflect cut product moving in the peripheral direction of the blade movement.

4. A hand knife for cutting meat and the like comprising a handle, a ring-like blade housing secured at one portion to and extending from the handle, a ring-like blade carried by the housing for rotary movement relative to the housing, said housing circumferentially encircling a portion of the outside periphery of the blade, a wear plate secured against said housing adjacent the handle of said knife, said plate having an arcuate wear surface facing the inside circular surface of the blade and located relative to the housing to contact the inside circular surface of the blade during cutting when a force is applied to the blade in a direction having a component away from the handle, an end surface on said wear plate transverse to and directly adjacent the inside circular surface of the blade, facing toward the direction of blade rotation to deflect cut product moving in the peripheral direction of the blade movement, and a knife edge on said end surface at the juncture of the end surface and the inside peripheral surface of the circular blade.

5. A hand knife for cutting meat and the like comprising a handle, a ring-like blade housing secured to and extending from the handle, a ring-like blade carried by the housing for rotary movement relative to the housing, said housing circumferentially encircling a portion of the outside periphery of the blade, the housing having a circular portion with an inside diameter substantially equal to the outside diameter of the blade and an arcuate portion where the housing is secured to the handle with an inside diameter smaller than that of the circular portion and axially displaced from the plane of said circular portion, a wear plate secured against said housing adjacent the arcuate portion, said plate having first and second arcuate surface portions facing in the direction of the inside circular surface of the blade, said first arcuate surface portion having an outside diameter substantially equal to the inside diameter of said arcuate portion of the housing and said second arcuate surface portion of the wear plate having an outside diameter substantially equal to the inside diameter of said blade and located relative to the housing to contact the inside circular surface of the blade during cutting when a force is applied to the blade in a direction having a component away from the handle, said plate having an end surface transverse to and directly adjacent the inside circular surface of the blade, facing toward the direction of blade rotation to deflect cut product moving in the peripheral direction of the blade movement, and a knife edge on said end surface at the juncture of the end surface and the inside peripheral surface of the circular blade.

* * * * *